(12) United States Patent
Beghelli

(10) Patent No.: US 12,372,216 B2
(45) Date of Patent: Jul. 29, 2025

(54) LIGHTING FIXTURE WITH AN INTEGRATED MECHANICAL FIXING AND ELECTRICAL CONNECTION SYSTEM

(71) Applicant: BEGHELLI SPA, Valsamoggia (IT)

(72) Inventor: Gian Pietro Beghelli, Valsamoggia (IT)

(73) Assignee: BEGHELLI SPA, Valsamoggia (IT)

( * ) Notice: Subject to any disclaimer, the term of this patent is extended or adjusted under 35 U.S.C. 154(b) by 12 days.

(21) Appl. No.: 18/577,822

(22) PCT Filed: Jul. 18, 2022

(86) PCT No.: PCT/IT2022/050212
§ 371 (c)(1),
(2) Date: Jan. 9, 2024

(87) PCT Pub. No.: WO2023/007521
PCT Pub. Date: Feb. 2, 2023

(65) Prior Publication Data
US 2024/0337358 A1    Oct. 10, 2024

(30) Foreign Application Priority Data
Jul. 29, 2021 (IT) .................. 102021000020336

(51) Int. Cl.
*F21S 9/00* (2006.01)
*F21S 8/06* (2006.01)
(Continued)

(52) U.S. Cl.
CPC .............. *F21S 9/024* (2013.01); *F21S 8/063* (2013.01); *F21V 23/023* (2013.01); *F21V 23/0471* (2013.01); *F21Y 2115/10* (2016.08)

(58) Field of Classification Search
CPC .......... F21S 9/024; F21S 8/06; F21V 23/023; F21V 23/0471
See application file for complete search history.

(56) References Cited

U.S. PATENT DOCUMENTS 8,956,013 B1 * 2/2015 Shew .................... F21V 23/023
362/183
10,935,225 B2 * 3/2021 Brunelli ................ H01R 13/60
(Continued)

FOREIGN PATENT DOCUMENTS

IT      RM201000204 A1     10/2011
WO     WO 2017/120705 A1    7/2017

OTHER PUBLICATIONS

International Search Report and Written Opinion for International PCT Application No. PCT/IT2022/050212 mailed May 12, 2022 in 8 pages.
(Continued)

*Primary Examiner* — Gerald J Sufleta, II
(74) *Attorney, Agent, or Firm* — Knobbe, Martens, Olson & Bear, LLP

(57) ABSTRACT

An integrated mechanical fixing and electrical connection system, comprising a junction box and a lighting fixture, wherein the junction box includes a first multipolar electrical connector for the electrical connection of the lighting fixture to the mains power supply of a system, a coupling mechanism and a second electrical connector for fixing and electrical connection of the lighting fixture to the junction box, a compartment adapted for housing accessories for the lighting fixture and an internal space available to the installer for the wiring of the electrical system which passes in correspondence of the fittings placed laterally and/or on the bottom of the junction box.

9 Claims, 9 Drawing Sheets

(51) Int. Cl.
    *F21S 9/02*         (2006.01)
    *F21V 23/02*      (2006.01)
    *F21V 23/04*      (2006.01)
    *F21Y 115/10*     (2016.01)

(56) References Cited

U.S. PATENT DOCUMENTS

| | | | |
|---|---|---|---|
| 11,339,932 B2 * | 5/2022 | Meir | F21S 4/28 |
| 2009/0244880 A1 * | 10/2009 | Rapeanu | F21S 9/022 |
| | | | 362/20 |
| 2013/0265764 A1 * | 10/2013 | Holman | F21V 19/02 |
| | | | 362/249.02 |
| 2018/0245783 A1 * | 8/2018 | Brunelli | F21V 14/02 |

OTHER PUBLICATIONS

Italian Search Report for Italian Application No. 102021000020336 dated Mar. 22, 2022 in 17 pages.

\* cited by examiner

LIGHTING FIXTURE WITH AN INTEGRATED MECHANICAL FIXING AND ELECTRICAL CONNECTION SYSTEM

The present invention concerns an emergency lighting and ordinary lighting fixture associated with integrated mechanical fixing, electrical connection and distribution systems of the electrical system.

More specifically, the invention concerns an emergency lighting and ordinary lighting fixture, wherein the nodes of interconnection and distribution of the electrical energy of the system also contain functional parts of the lighting device, which increase its modularity and flexibility; in addition, the emergency lighting and ordinary lighting fixture is realised with adjustable electro-optical systems, which the installer can easily conform to the installation conditions, customising them.

The invention therefore concerns the application field of the emergency lighting in particular and the plant engineering sector for the generic installation of lighting fixtures.

The ordinary lighting and emergency lighting fixtures have always used quick fixing systems, which also allow the automatic connection of the electrical parts; these are brackets, which also integrate electrical connectors and terminal boards, thus also acting as junction boxes.

At the state of the art, the power supply connection of an ensemble of (ordinary and/or emergency) lighting fixtures provides the distribution of energy along electrical distribution lines from which the power supplies of the individual fixtures are derived in parallel by means of proper and respective junction boxes.

Each individual lighting fixture can also provide a system of quick connection to the branch line section, by means of an electrified bracket. The electrical conductors of the branch line arrive at the electrified bracket and are connected to a terminal board. The installer then fixes the lighting fixture to the bracket and the electrical connections are made automatically through a system of electrical connectors.

A different connection topology, always of a traditional type, consists of the pass-through wiring system, also called "in-out", according to which the lighting fixtures are connected in series and an electrical distribution line enters a first fixture and then immediately exit and re-enter a second fixture, and so on.

There are also lighting fixtures built in such a way as to facilitate the pass-through connection. These provide internal terminal boards already prepared for this type of wiring. Usually, in this case, it is planned to use the bottom of the lamp as a junction box, inside which the wiring is made, which can be a terminal or pass-through wiring. To complete the installation, it is generally necessary to connect the active part of the lighting fixture, housed in the lid, to the bottom of the lamp, arrange the internal wiring in an orderly manner and close the fixture by means of interlocking solutions or fixing screws.

However, there are still no solutions that provide for the complete integration of a junction box with the coupling and quick connection system of the lighting fixture in order to facilitate the work of installation and electrical wiring, as well as the entire realisation of the system and its maintenance.

Even single lighting fixtures for obtaining various optical configurations are not known.

In fact, the only alternatives currently feasible are those relating to the use of different lighting fixtures for each optical configuration or to the possibility of physically changing the lenses of the fixture to obtain different configurations.

As regards the connection and fixing system, the alternative which can be currently used is fixing a bracket for mounting the lighting fixture on a junction box embedded in the wall, but in this case the convenience of mounting and dismounting the fixture is lost.

An aim of the present invention is therefore to realise a lighting fixture with an integrated mechanical fixing and electrical connection system, which allows the installer to realise the electrical system according to his habits, since it is sufficient for the installer to prepare some junction boxes completely similar to those he normally uses; in fact, the junction boxes according to the invention are prepared for the coupling and automatic connection of the lighting fixtures.

Another aim of the invention is to realise a lighting fixture with an integrated mechanical fixing and electrical connection system, which, in addition to make the installation easier, allows to simplify and speed up the maintenance and replacement of lighting fixtures.

A further aim of the present invention is to realise a lighting fixture with an integrated mechanical fixing and electrical connection system, which has a correct and efficient lighting measurement in relation to its geometric location in the rooms.

It is known, in fact, that the sector regulations require a certain degree of ground level lighting for the emergency (or safety) lighting depending on the type of room (corridors, offices, dining rooms, etc.) and that the emergency lighting fixtures are generally oversized in order to produce light in blackout conditions at levels above the minimum legal requirements, but this usually has as a consequence an inefficiency resulting in larger overall dimensions and less aesthetic and functional appeal, due to to the batteries incorporated in the fixtures themselves, which must be oversized to produce a greater intensity of light than necessary for the time required by the regulations (1 hour, 2 hours, 3 hours or other intervals).

The aim is therefore to implement innovative solutions, which allow, in a simple and functional way for the installer, to adjust each lighting fixture to the particular installation condition by dosing the light at the required level and for the required time; all of this by creating particularly compact and aesthetically non-invasive emergency lighting fixtures.

These and other aims are achieved by an integrated mechanical fixing and electrical connection system, according to the attached claim 1; further detailed technical characteristics are present in the subsequent dependent claims.

Advantageously, a multifunctional junction box is used which automatically becomes the site for installing an ordinary (such as service lights, projectors and/or reflectors) and emergency (such as anti-panic lamps and/or signal lamps) lighting fixture, thus constituting a point of light; the box is used directly in every point where a point of light is provided and simplifies the installer's work, because in many cases he can also use it as a junction box, as it has exactly the dimensions and arrangement of traditional junction boxes, requiring the same type of fittings, screws, plugs, etc.

In particular, the new junction box according to the invention is perfectly compatible with the standard junction boxes and with the relative installation accessories (cable ducts and pipes) and integrates the electrical connectors and the coupling mechanisms for quick installation on the box itself of a lighting fixture.

The junction box is also designed to house inside, in addition to the wiring operated by the installer, also redundant parts of the lighting fixture or functional accessories thereof.

Furthermore, the lighting fixture can be equipped with several lenses with different emissions (for example concentrating lenses, wide-angle lenses and lenses with elliptical side emission, i.e. with elongated lobes along the longitudinal axis of the fixture) and each group of lenses of the same, type is driven with an independent LED set, whose driving current is governed by a microprocessor, which, programmed during its installation, adjusts the light emission and therefore the overall photometric solid to the specific installation conditions (a ceiling mounting, a wall mounting, a mounting along a corridor, a mounting in a classroom, etc.).

The junction box has a series of electrical connectors dedicated to the quick connection with the lighting fixture and an interlocking coupling system that allows the positioning and mechanical fixing of the fixture itself on the junction box.

The box also contains a special compartment that can accommodate an accessory of the lighting fixture, such as an additional battery, a communication module, a measurement module.

Advantageously, the new optical part of the lighting fixture includes several sets of lenses of the same type. Each set of lenses is illuminated by the same set of LEDs and each set of LEDs is driven by a current generator independent from the others. A microprocessor governs each current generator by adjusting its intensity to a predetermined value during its installation.

Still advantageously, the new box with connection and quick coupling houses inside plenty of space for the wiring of the conductors of the electrical system, both pass-through wiring and branch wiring, and allows the installer to fully realise the system even without having yet mounted the lighting fixture.

A special compartment of the new box with a connection and quick coupling houses a possible additional accessory allowing the installer to always use the exact same lighting fixture at any installation point, customising its functions using the accessory associated with the box. In case of maintenance due to failure of the lighting fixture (the element of the ensemble having less reliability), the installer is able to replace the fixture with a standard fixture regardless of the special functions because the accessory customising its functions is inside the junction box.

With a different purpose, in case the installer wishes to enhance the autonomy of an emergency lighting device, he can use the special compartment by inserting an additional battery that allows to increase the light flux emitted by the fixture or to increase its autonomy. Also in this case the emergency lighting fixture that the installer will mount on that box is the standard one and, in case of maintenance, he will not have to resort to a special fixture, since the particularisation is inside the new junction box.

In case of use of an additional battery, the special compartment, being more thermally insulated from the lighting fixture, allows to keep lower the temperature of the additional battery, increasing its duration and reliability. Furthermore, the maintenance of the battery can be carried out without disconnecting the system from the power supply, since by uncoupling the emergency lighting fixture also the additional battery is completely disconnected.

The system for regulating the current intensity and therefore the light flux emitted by each homogeneous group of lenses allows to adjust the light emission of the lighting fixture in the various directions (the so-called photometric solid) to the installation conditions, always using the same standard fixture and without mechanically modifying it (an alternative method used today in the state of the art is for example to change the lenses used). The adjustment operation is carried out via "software", in the sense that the fixture does not physically change but is only configured through programming operations.

Advantageously, the invention reduces installation costs, simplifies installation and maintenance operations, increases the efficiency of emergency lighting and simplifies the photometric adjustment of emergency lighting sources to the installation conditions.

Furthermore, the junction box described in the present invention integrates the connection and automatic coupling systems of the lighting fixtures and, at the same time, the installer finds space inside the box for the wiring of the system, both a terminal wiring and a pass-through wiring.

The new junction box has a dedicated compartment for customising the lighting fixture, but the lighting fixture used is always of the same type on each box, in order to facilitate the maintenance.

Finally, the emergency lighting fixture is universal and adjusts itself to the photometric installation conditions through a "software" configuration.

The present invention will now be described, by way of non-limiting example, according to some of its preferred embodiments, and with the aid of the attached figures, where:

Figure 1:
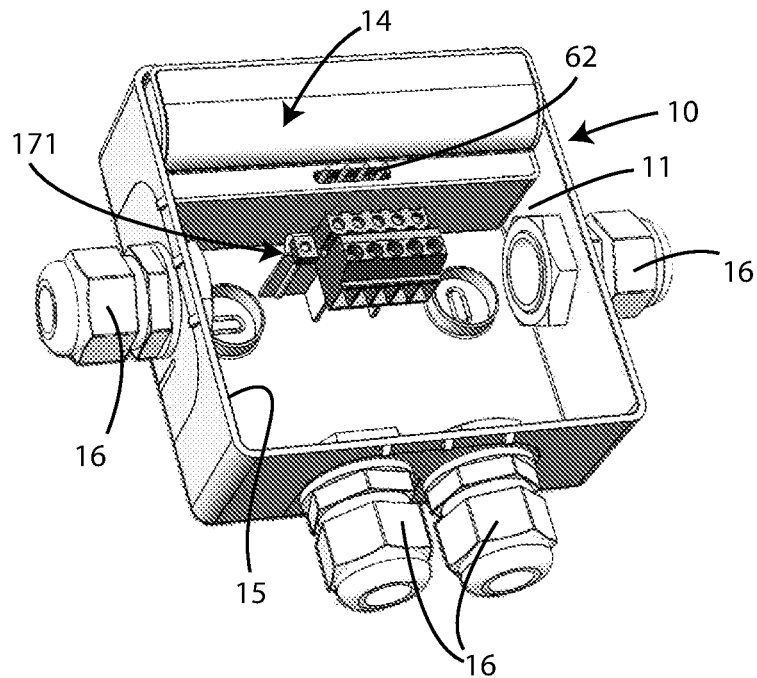
FIG. 1 shows an internal perspective view of a first exemplary embodiment of a modular junction box used in the integrated mechanical fixing and electrical connection system, according to the present invention.

With reference to the aforementioned figures, the integrated mechanical fixing and electrical connection system, object of the present invention, comprises a junction box 10, which includes a multipolar electrical connection device 11 for the electrical connection of a (ordinary and/or emergency) lighting fixture 2, 3, 4, 5, 6 to the mains power supply of a system, a quick coupling mechanism with relative electrical connections for the secure fixing and the connection of the lighting fixture 2, 3, 4, 5, 6 to the junction box 10, a compartment 14 adapted to house suitable accessories of the lighting fixture 2, 3, 4, 5, 6 and an internal space 15 available to the installer for wiring the electrical system, which are connected in correspondence with the fittings 16 placed laterally to the junction box 10 (FIG. 1).

The quick coupling mechanism advantageously comprises a series of shaped seats 12 obtained on the back of the lighting fixture 2, 3, 4, 5, 6 where the junction box 10 is housed and a series of spring hooks (not illustrated in the attached figures) made on the lighting fixture 2, 3, 4, 5, 6, which fit into the vertical walls of the junction box 10.

The junction box 10 is also equipped with a lid (not shown in the attached figures) to be used if a lighting fixture 2, 3, 4, 5, 6 is not installed thereon.

A bubble 171 is advantageously fixed inside the junction box 10, allowing the installer to easily position the box itself in a perfectly horizontal position.

Figure 2:
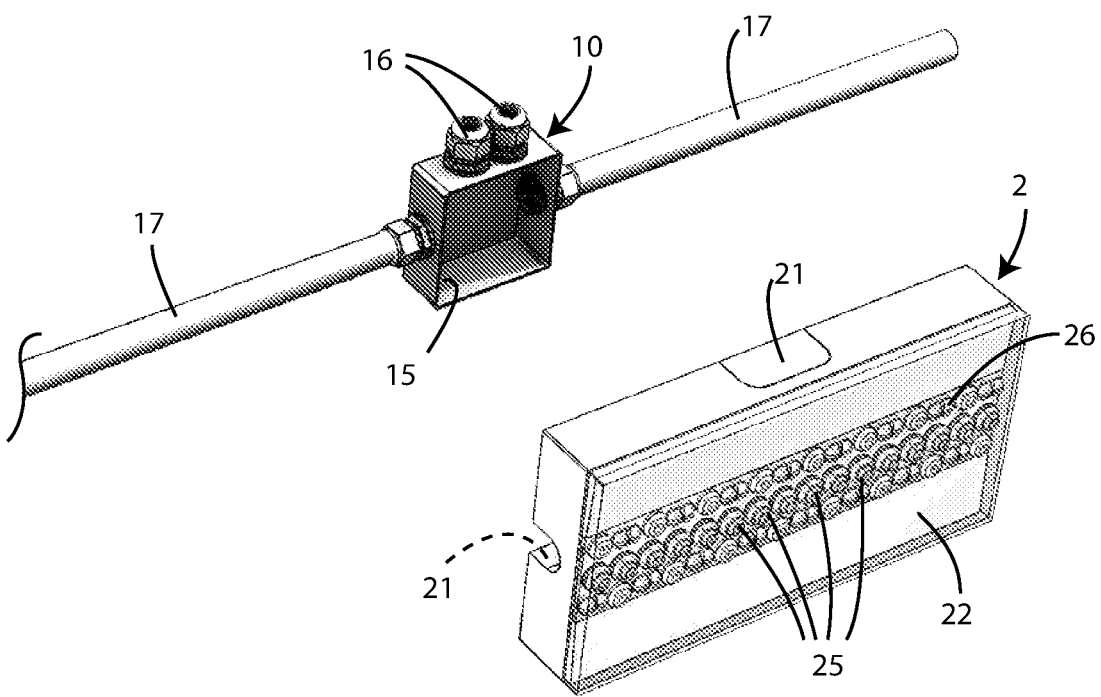
FIG. 2 shows a front and exploded perspective view concerning the installation of a first embodiment of lighting fixture on the junction box of FIG. 1, according to the present invention.
Figure 3:
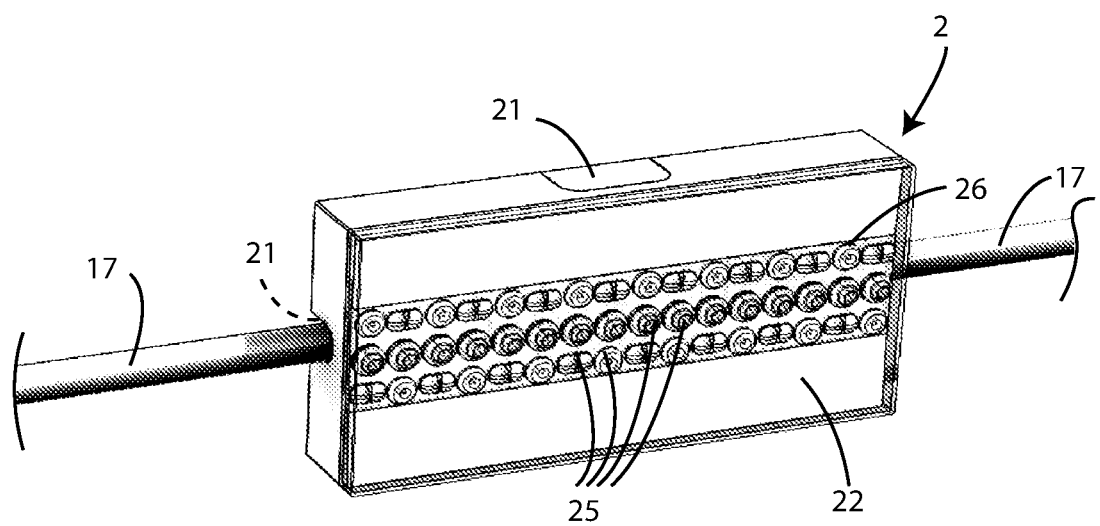
FIG. 3 shows a front perspective view of the lighting fixture of FIG. 2, once installed, according to the invention.
Figure 4:
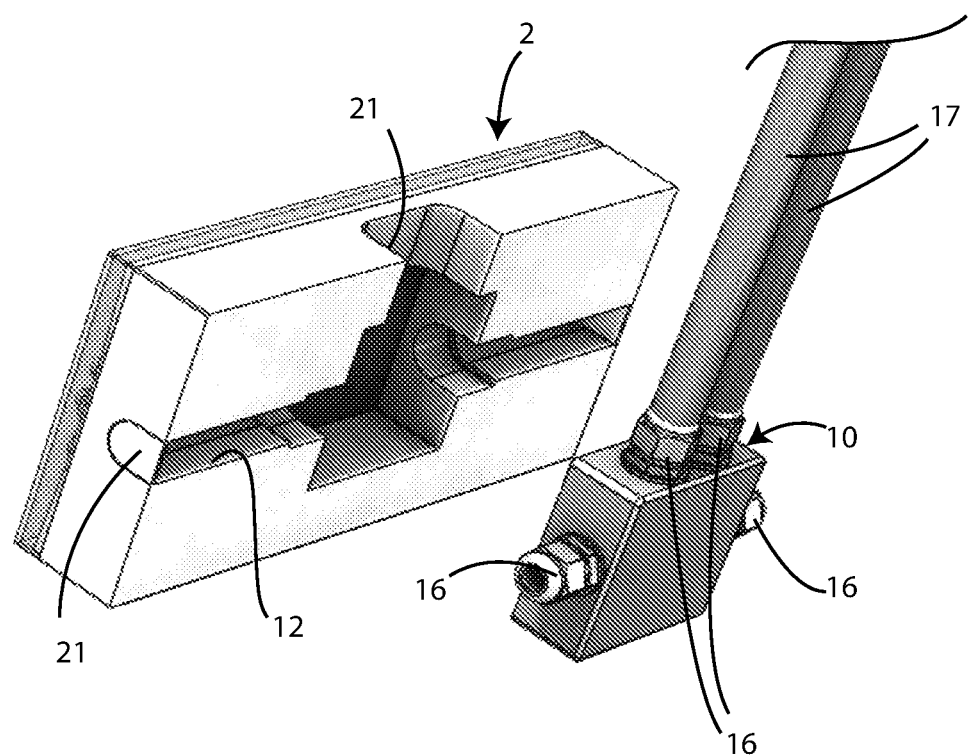
FIG. 4 shows a rear and exploded perspective view of the lighting fixture of FIGS. 2 and 3, according to the invention.

FIGS. 2, 3 and 4 show, by way of example, an ordinary and/or emergency lighting fixture 2 combined with the junction box 10, where the fittings 16 and the pipes 17 that can be used for the electrical connections to the junction box 10 are visible, as well as pre-engraved shapes on the lighting fixture 2 for the removal of the respective partitions 21 in case of passage of the pipes 17 of the electrical system in a parallel (lateral) or perpendicular direction to the plane that identifies the light emitting surface 22 of the fixture 2.

In FIG. 3 it is shown the lighting fixture 2 during installation, with the pipes 17 of the electrical system passing laterally to the light emitting surface 22 of the lighting fixture 2.

In FIG. 4 it is shown a detail view of the mechanical conformation and of the seats 12 provided on the back (on the side opposite to the light emission surface 22) on the lighting fixture 2.

The cases exemplified and illustrated in the aforementioned figures relate to electrical systems with external ducts. It is clear that the junction box 10 can also be applied to systems with ducts inside the walls of a building. In the latter case, the pipes or electrical conductors 17 are designed to enter from the bottom of the junction box 10 and the lighting fixture 2, 3, 4, 5, 6 completely envelops the junction box 10 with a perfect aesthetic result, hiding the relief of box 10 from the wall, so as to also conceal the pipes 17 outgoing laterally to the lighting fixture 2, 3, 4, 5, 6. The fact of positioning the junction box 10 outside the wall of the building facilitates in any case the installation and wiring operations of the electrical conductors by the installer.

Figure 5:
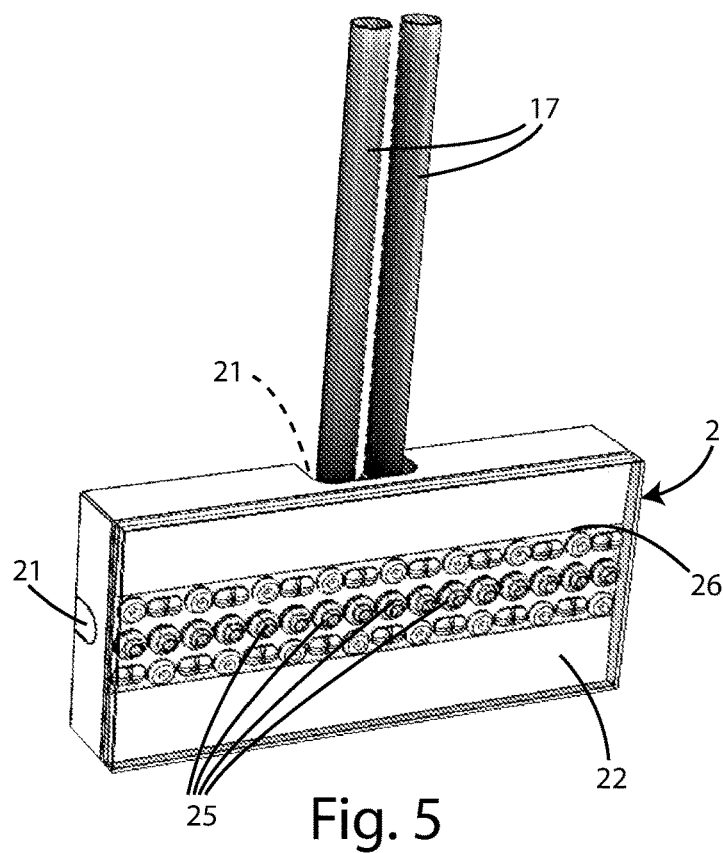
FIG. 5 shows a front perspective view of the lighting fixture of FIGS. 2, 3 and 4, according to another installation configuration, according to the present invention.
Figure 5A:
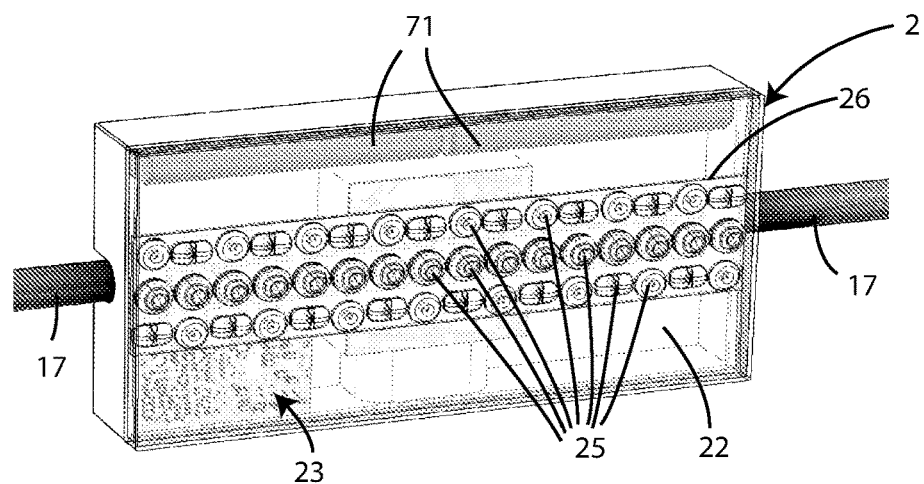
FIG. 5A shows a front perspective view of the lighting fixture of FIGS. 2, 3, 4 and 5, according to a further installation configuration, according to the present invention.
Figure 6:
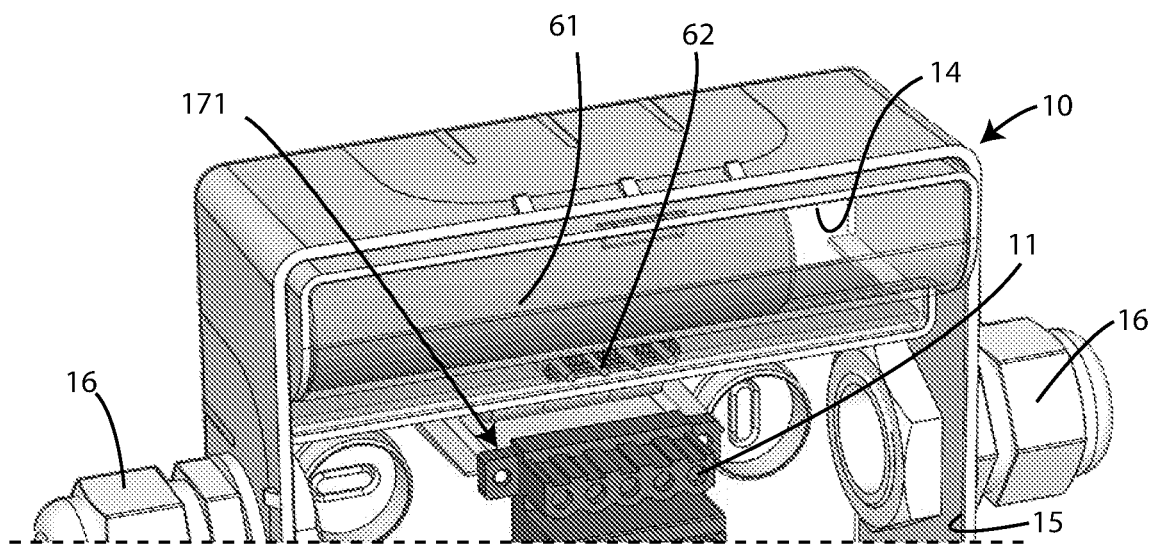
FIG. 6 shows a partial and enlarged internal perspective view of the junction box of FIG. 1, according to another embodiment object of the present invention.

FIG. 5 shows a view of the lighting fixture 2 applied to the junction box 10 with the pipes 17 of the electrical system coming from above, while FIG. 5A shows a transparent view of the emergency lighting fixture 2, where the electronic operating circuit 23 and the supply batteries 71 are visible; on the light emitting surface 22 it is possible to see the reflector 26, the lenses and the LEDs 25.

It is therefore clear that with the use of the junction box 10 it is possible at any time to transform any lighting fixture prepared for the new box 10 into an emergency fixture, simply by mechanically and electrically connecting the fixture to the respective seats 12 of box 10, without carrying out a complicated assembly or wiring.

In fact, it is possible to decide, when the system has already been realised, which lighting fixture is to be activated in emergency and/or move the fixtures with each other in the desired positions; moreover, it is possible to carry out maintenance on the fixtures without opening them and in complete safety without disconnecting the system from the power supply.

FIGS. 6, 7, 8 and 9 illustrate a series of possible accessories that can be housed inside the compartment 14 of the junction box 10.

In particular, the compartment 14 can contain an additional battery 61, with a relative electrical connector 62 in case of use of an emergency lighting fixture.

The additional battery 61 can be used as a redundant element or as an addition of energy to increase the performance of the lighting fixture in terms of light flux or duration in case of blackout.

The electrical connector 62 is dedicated to the connection of the emergency lighting fixture (applied to the junction box 10) and is separated from the main electrical connection fixture 11; in this way, the correct electrical insulation is maintained, thus allowing the maintenance of the system even without disconnecting the electrical system from the power supply.

Figure 7:
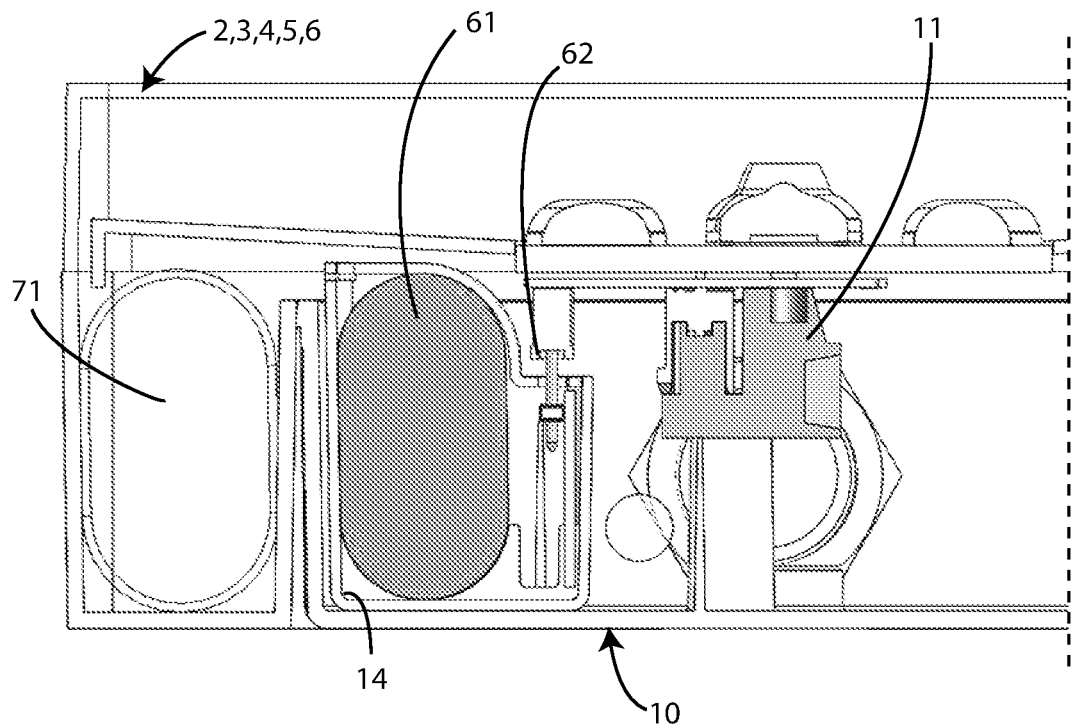
FIG. 7 shows a partial sectional view of the junction box of FIGS. 1 and 6 coupled to a lighting apparatus, according to the present invention.

FIG. 7 shows a detail of the electrical interconnection system between the junction box 10 and the lighting fixture 2, 3, 4, 5, 6, where 71 indicates a standard battery contained in the emergency lighting fixture.

Also in this case, advantageously, the installer can modify the lighting fixture by inserting the additional battery 61 for obtaining the desired functions for increasing the performance of the emergency lighting fixture in ordinary conditions and/or in conditions guaranteeing a supply of energy in case of malfunction of the main battery.

It is therefore clear that, according to the invention, such functions can be obtained without opening the lighting fixture and that the installer can modify the configuration of the system also in a second step, as well as he is able to carry out the maintenance of the system without opening the lighting fixture and in complete safety, since it is not necessary to disconnect the system from the power supply.

In addition, the additional battery 61 can work in optimal conditions since it does not undergo the internal overheating of the lamp of the lighting fixture and therefore can have a longer life than traditional solutions.

Consequently, it is also possible to provide for the use of emergency lighting fixtures that have only an external auxiliary battery, in order to reduce the labor costs for the maintenance.

Figure 8:
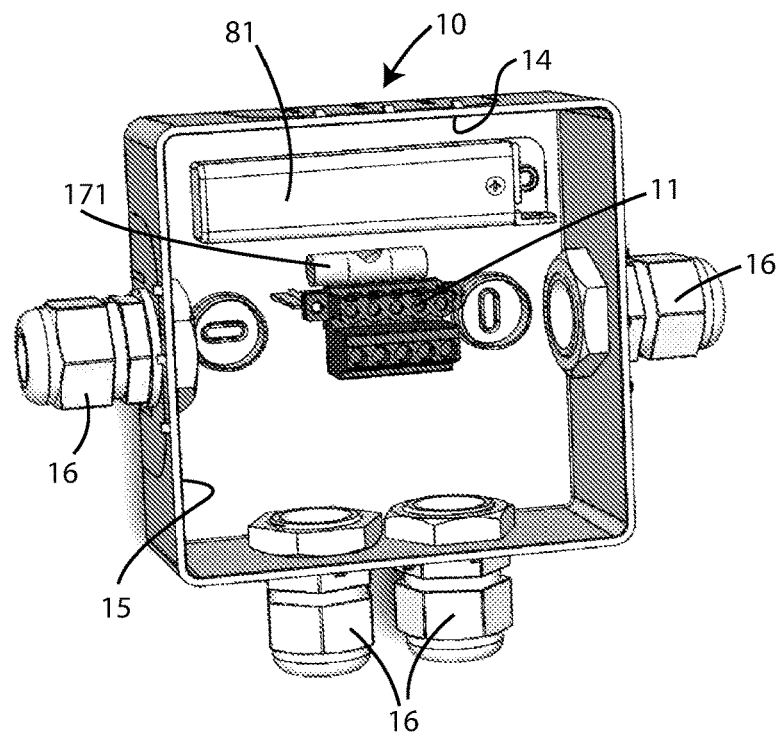
FIGS. 8 and 9 show further internal perspective views of the junction box of FIGS. 1, 6, 7 and 8, according to further embodiments object of the present invention.

Inside the compartment 14 can also be housed a radio communication module 81, with electrical connections of the same type as those of the auxiliary battery 61, which allows to create networks of interconnected and remotely controllable lighting fixtures (FIG. 8).

The radio communication module 81 can integrate a temperature sensor to detect fast localised temperature increases, for example caused by a fire, and/or other positioning sensors to control the position of people inside a building, the traffic and the routes and/or the devices of connection to dynamic emergency systems to manage the evacuation routes in function of hypothetical fires and the position of people.

The radio communication module 81 can also integrate a Wi-Fi signal repetition system, also bringing it outside the buildings.

Figure 9:
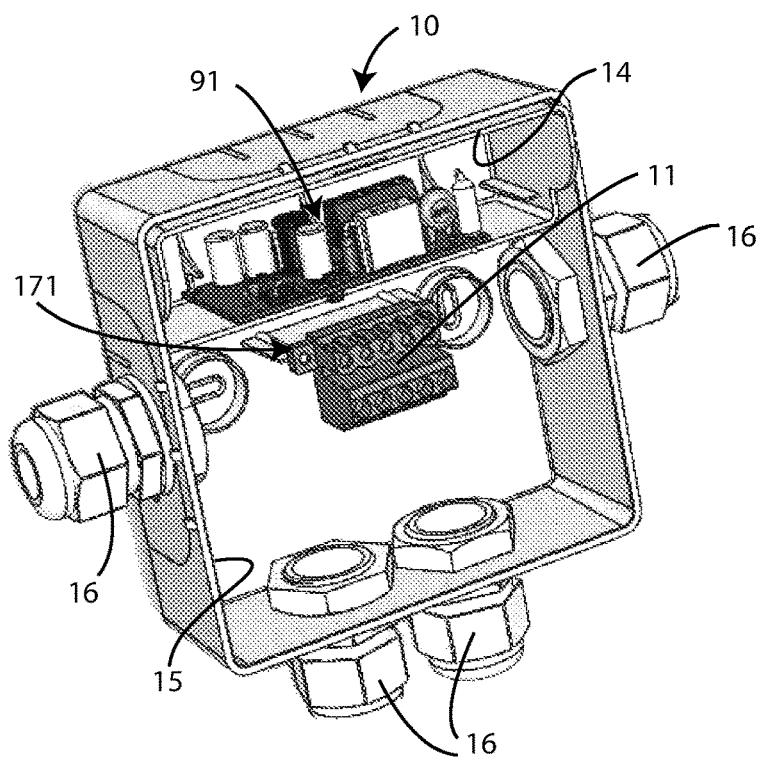

A monitoring and measurement module 91 can also be housed in the compartment 14, having electrical connections of the same type as those of the auxiliary battery 61 and consisting of an electronic circuit for monitoring the electrical system and measuring the power and energy consumed by the electrical utilities of the system or by the associated lighting fixtures (FIG. 9). The module 91 has an incorporated receiver for radio communication and remote management.

Also in this case it is possible to activate the energy monitoring and metering functions, as well as additional home automation functions, simply by using the module 91 and without carrying out a special assembly or wiring.

Furthermore, the module 91 can also be installed at a later time or it can be used for an energy diagnosis on some lighting fixtures and then moved to others, in order to carry out analyses and statistics without having to purchase a complete home automation system.

The ordinary or emergency lighting fixture 2, 3, 4, 5, 6 incorporates a series of lenses and LEDs 25 on the light emitting surface 22; in practice it is a series of electro-optical emitters with adjustable intensities in order to obtain an infinite variety of photometric diagrams adjustable to the multiple installation conditions.

In particular, the light emitting part of the lighting fixture 2, 3, 4, 5, 6, which corresponds to the reflector 26 of the surface 22, consists of a series of strings of white LEDs and each set of LEDs of a string is associated with a specific type of optical lens, as in the exemplary embodiments illustrated in FIGS. 2, 3, 3A, 3B, 3C, 3D, 5 and 5A.

For example, in case of three different types of lenses 25, it is possible to make a reflector 26, with:
  type 1 or concentrating lenses (telephoto lens);
  type 2 lenses, with a wide emission angle (wide angle lens);
  type 3 lenses, with an elliptical diagram ("side emitting"), according to which the light emission beam is elongated in one direction and narrow in the direction orthogonal thereto.

For example, in the embodiments of the lighting fixture shown in FIGS. 2, 3, 5 and 5A, the emitting part of the reflector 26 comprises three strings of LEDs 25, each associated with a type of lens. Each string can be adjusted separately from the others by an appropriate electronic circuit 23 of the lighting fixture 2, 3, 4, 5, 6. In particular, by dosing the light intensities and/or by selectively switching on or switching off one or more strings of LEDs 25, it is possible to build a desired diagram of light emission of the lighting fixture.

Figure 3A:
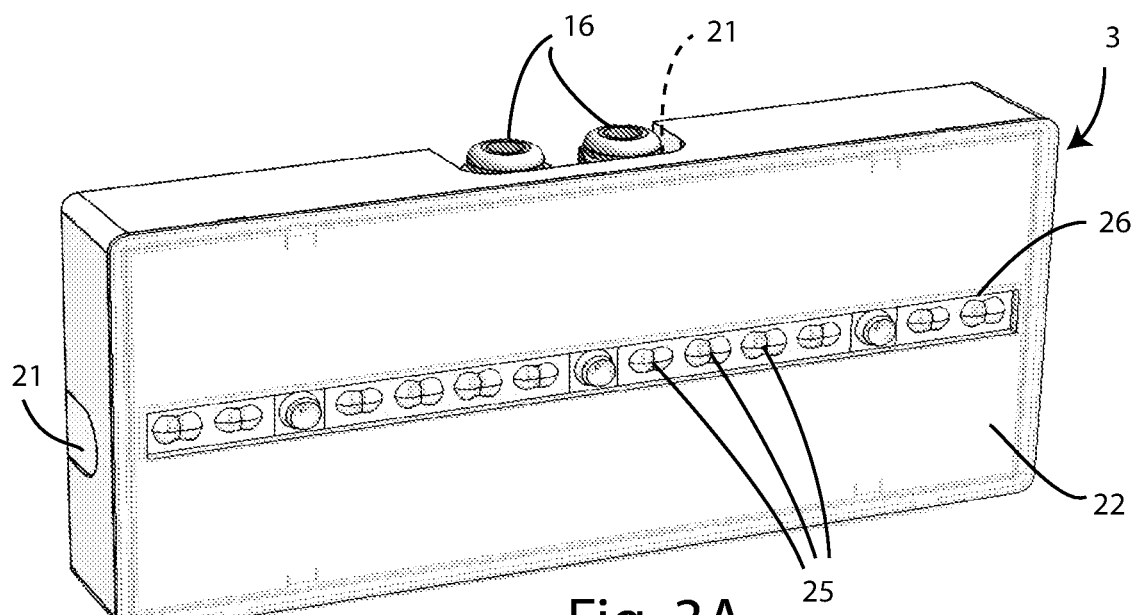
FIG. 3A shows a front perspective view of a second embodiment of the lighting fixture of FIG. 2 according to the invention.
Figure 3B:
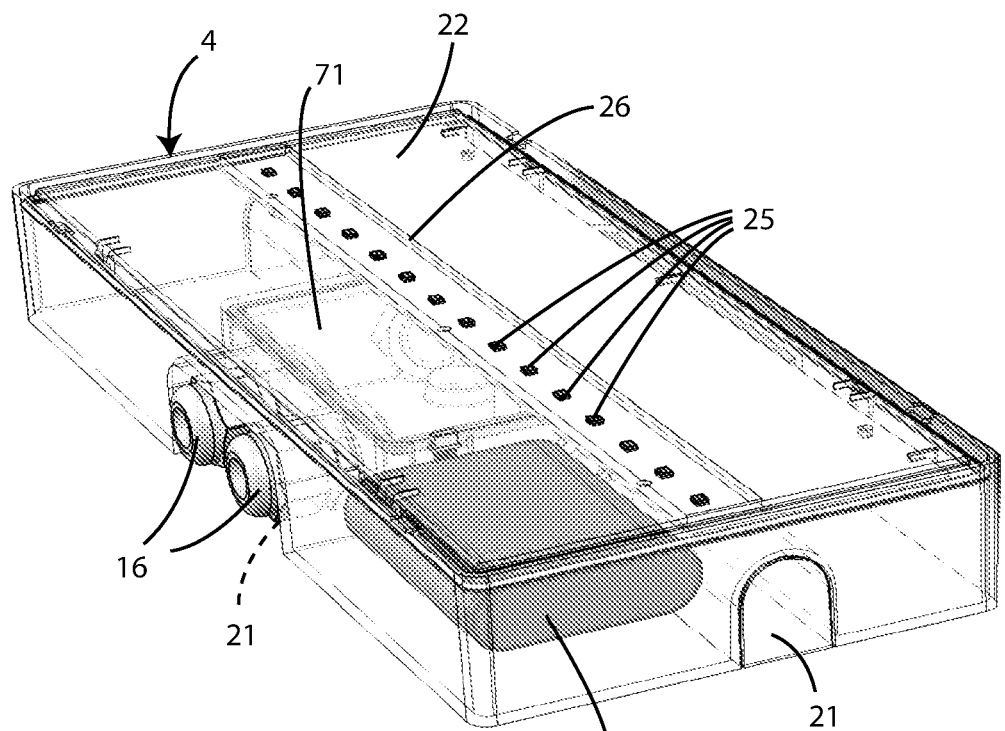
FIG. 3B shows a front perspective view of a third embodiment of the lighting fixture of FIG. 2 according to the invention.
Figure 3C:
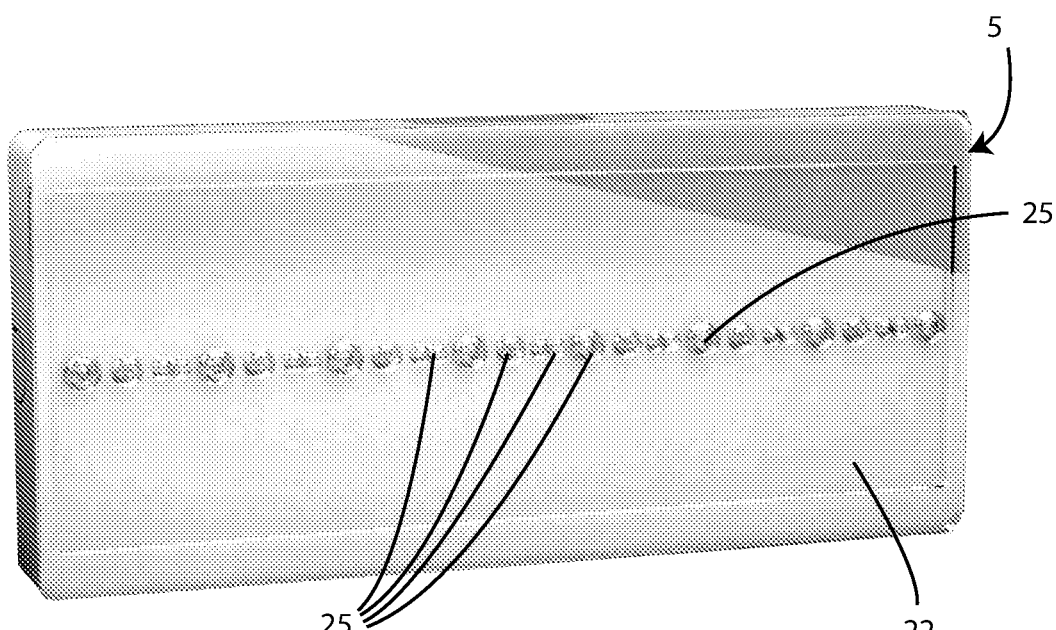
FIG. 3C shows a front perspective view of a fourth embodiment of the lighting fixture of FIG. 2 according to the invention.
Figure 3D:
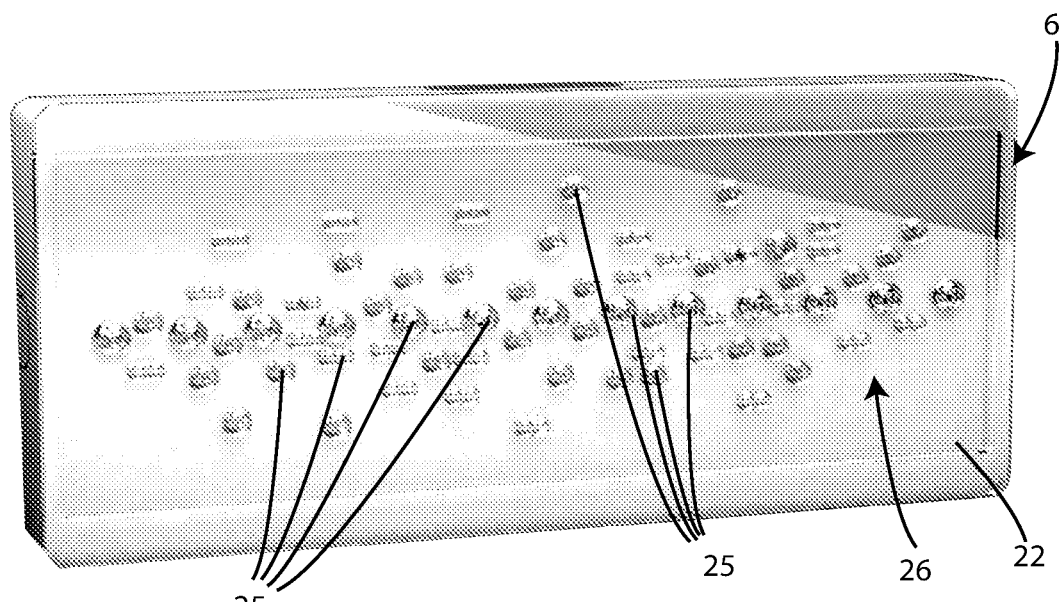
FIG. 3D shows a front perspective view of a fifth embodiment of the lighting fixture of FIG. 2 according to the invention.

The arrangement of the light emitters (lenses and/or LED 25) can also be achieved by arranging all the lenses (concentrating, magnifying and elliptical lenses) and the LED 25 on a single row, thus simplifying the construction, as in FIGS. 3A, 3B and 3C, and the relative light performances among the various practical embodiments can, for the same type of lenses, be made equivalent to each other by varying the driving intensity of the set of lenses and/or LEDs 25.

Furthermore, the solution with a single row of lenses and/or LEDs 25 allows the use of a limited number of LEDs, with significant advantages in terms of overall dimensions and costs. This solution also makes it possible to realise all the electrical and electronic parts on a single circuit, including the electrical interconnections with the input terminal board and with possible external modules. An optical design of this type is undoubtedly rational and allows a good optimisation of the lenses.

As mentioned, the electrical connections between the junction box and the ordinary and/or emergency lighting fixture 2, 3, 4, 5, 6 include connectors 11 and 62, electrically insulated from each other.

Figure 10:
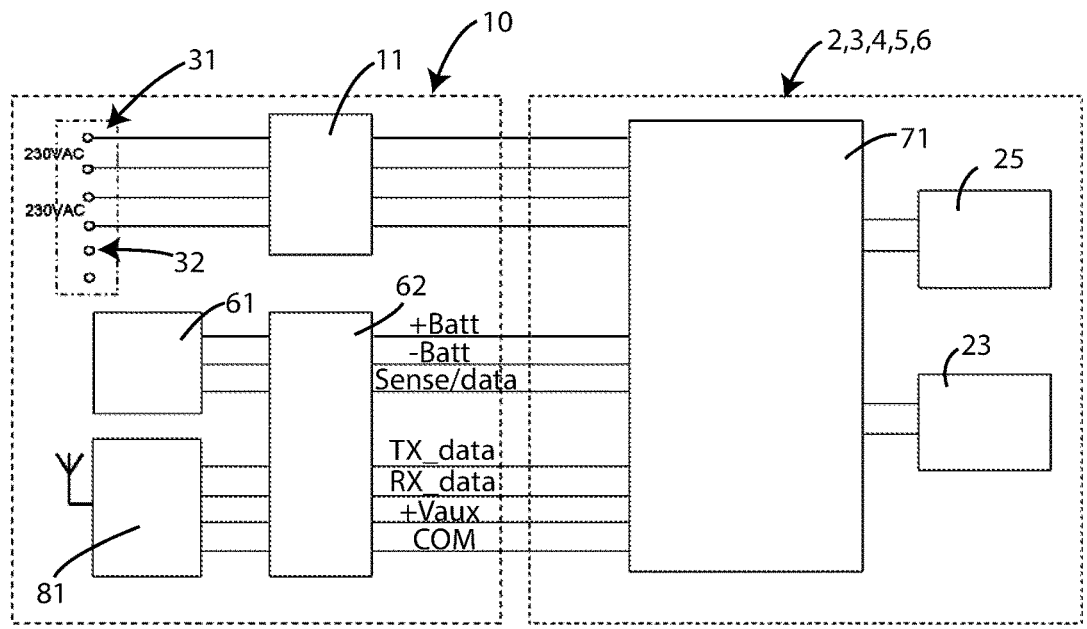
FIG. 10 shows a block diagram of a circuital implementation solution of the electrical connections provided in the integrated mechanical fixing and electrical connection system, according to the present invention.

In particular, the main electrical connector 11 supplies the lighting fixture 2, 3, 4, 5, 6 with the electrical energy coming from the mains power supply 31 of the system, while the connector 62 connects the lighting fixture 2, 3, 4, 5, 6 to one or more accessories contained in the junction box 10, as shown in the diagram of a possible implementation solution of FIG. 10, wherein the example refers to an emergency lighting fixture.

The main electrical connector 11 (supplying power) has the 4 conductors coming from the terminal board 32 and relating to the mains voltage supplies, the permanent one and the interrupted one.

The electrical connector 62 of the accessories has the following connections:
  +Batt, positive pole of the additional battery 61;
  −Batt, negative pole of the additional battery 61;
  Sense/data, measurement signal for checking the connection of the battery 61 or for measuring the working temperature of the battery 61, or time division based bidirectional serial communication channel for communication with a possible diagnostic/recharging circuit incorporated in the additional battery 61;
  TX_data, data transmission serial line for communication between the lighting fixture 2, 3, 4, 5, 6 and the radio module 81;
  RX_data, data reception serial line for communication between the lighting fixture 2, 3, 4, 5, 6 and the radio module 81;
  +Vaux, auxiliary voltage supplied by the lighting fixture 2, 3, 4, 5, 6 for the possible power supply of the radio module 81 or of an auxiliary module;
  COM, common wire (common negative between TX, RX and +Vaux).

Figure 10A:
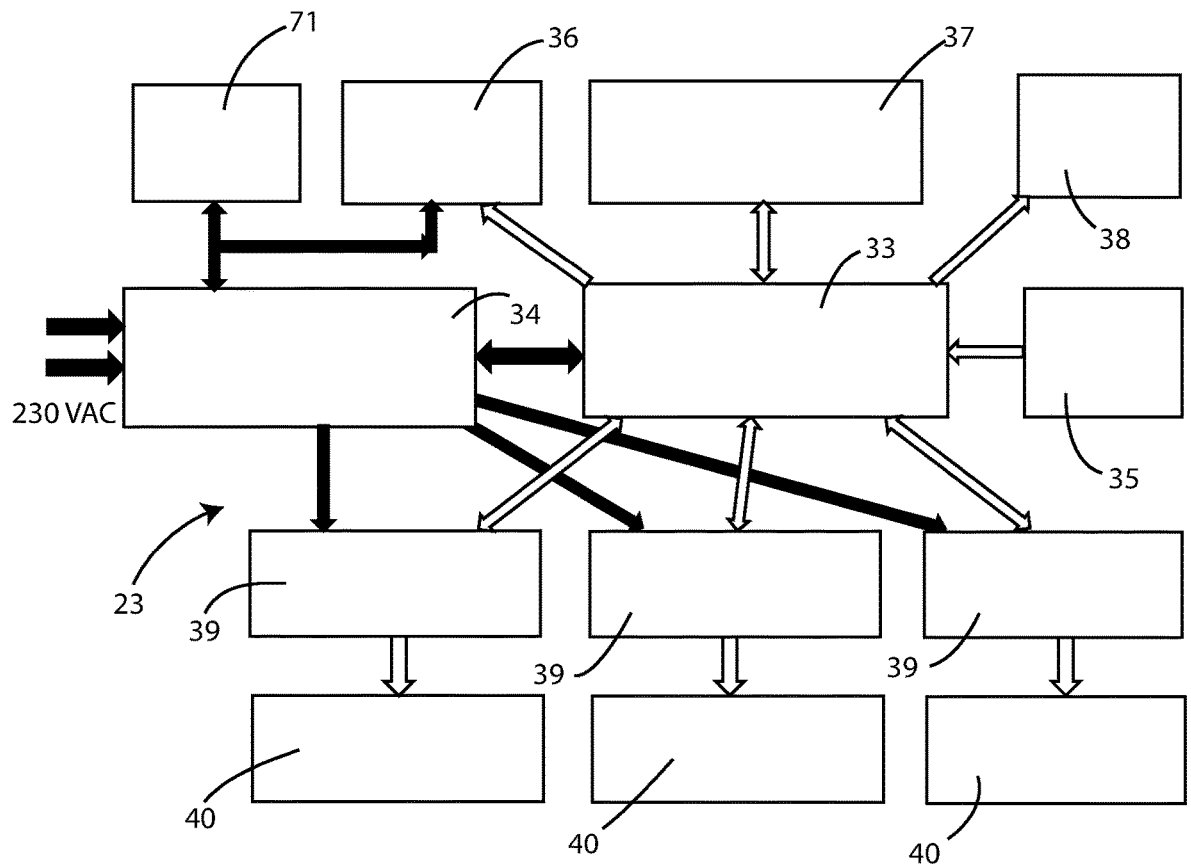
FIGS. 10A and 10B show respective operating block diagrams of two embodiments of a control circuit adapted to control and regulate a lighting fixture of the integrated mechanical fixing and electrical connection system, according to the present invention.

The block diagram of FIG. 10A illustrates the components and the operation of the electronic control circuit 23 of the lighting fixture 2, 3, 4, 5, 6, which integrates all the control and regulation functions of the various constituent electrical elements, according to a first possible embodiment.

In particular, the electronic control circuit 23 comprises a microprocessor 33, which, connected to a block 34 containing a power supply unit, a battery charger and presence sensors of the electrical network, governs the operation of the entire fixture 2, 3, 4, 5, 6 and of the entire system and coordinates the various subsystems, according to the following functionalities.

The microprocessor 33 manages the logic operating lighting in general and the emergency lighting in particular, switching on and switching off the light beam emitted in case of a black-out in accordance with the international regulatory requirements, depending on the conditions of the monitored 230 VAC power lines (or other voltage distributions depending on the States).

In addition, the microprocessor 33 manages the charge of the battery 71 inside the lighting fixture 2, 3, 4, 5, 6 and, through a specific interface 36, manages the charge of the auxiliary battery 61 inserted in the junction box 10.

Furthermore, the microprocessor 33 manages a further serial interface 37 towards the junction box 10 by communicating with the possible functional module present in the box itself, as well as switches on, switches off and modulates a series of signaling LEDs 38 indicating the status of the lighting fixture 2, 3, 4, 5, 6 and reads the configuration of possible configuration selectors 35 of the lighting fixture 2, 3, 4, 5, 6 (dip-switches, jumpers, rotary selectors, etc.).

Finally, the microprocessor 33 regulates, by means of a series of respective current regulators 39, the driving current intensity of each different string 40 of emitting LEDs (type 1 or concentrating, type 2 or magnifying and type 3 or elliptical) by acting on the aforementioned related current regulators 39.

The current regulators 39 which drive the strings 40 are all of the high-frequency switching type and of the high conversion efficiency type. In a preferred embodiment, such regulators 39 are of the buck type and are governed by the microprocessor 33 by means of suitable PWM output channels of the microprocessor 33 itself. In this case, the microprocessor 33 regulates the intensity of the three currents by modulating the duty-cycle of the three PWM channels.

Figure 10B:
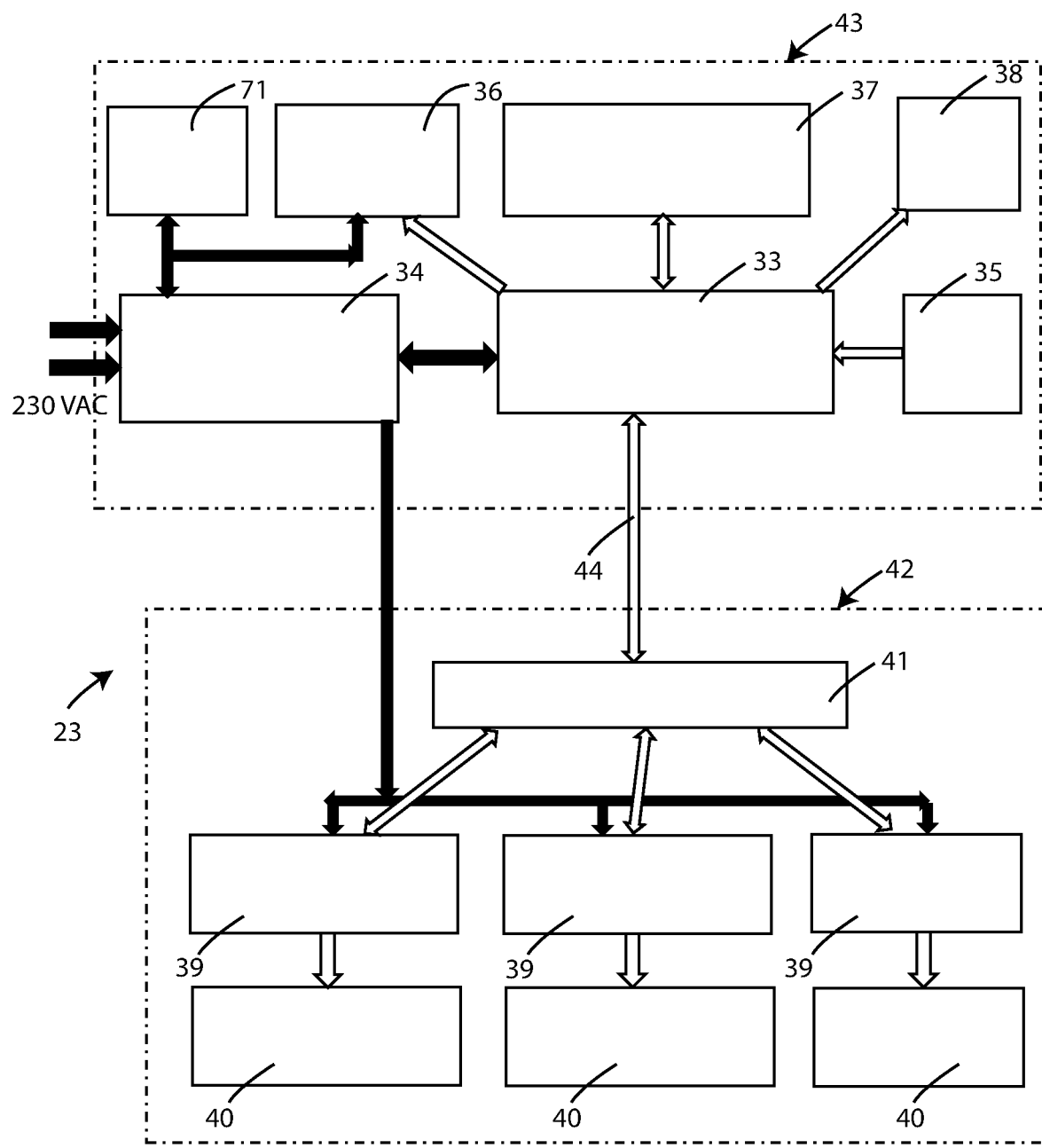

In a second possible embodiment of the electronic control circuit 23 (shown in the block diagram of FIG. 10B), the emitting LEDs are driven by a second small microprocessor 41 housed in a circuit (LED circuit 42) separate from the main circuit 43. In this case, the second microprocessor 41 communicates with the main microprocessor 33 by means of a serial line 44.

This second embodiment has the advantage of a greater standardisation, since the main circuit 43 is universal and can be used in all lighting fixtures 2, 3, 4, 5, 6, regardless of the size and of the specific optical configuration, while the LED circuit 42 is what possibly customises different models with different geometric configurations of LEDs.

The main microprocessor 33 communicates with the microprocessor 41 of the LED string by means of a serial line which can be of the monodirectional type with a single wire (only commands sent from the microprocessor 33 to the microprocessor 41), of the bidirectional type with a single wire (commands sent from the microprocessor 33 and responses received by the microprocessor 41 by time division) and of the bidirectional type with two wires (commands sent from microprocessor 33 and responses received by microprocessor 41 in parallel).

The first and second solutions are preferred because they minimise the cost of the interconnection between the two circuits 42 and 43, which can thus be realised with only 3 wires: +V, TX(RX) and a common wire.

The LED circuit 42 is simple and inexpensive to make, because, preferably, the switching converters which regulate the current intensities of the high frequency and high efficiency LED strings 40 are made by adding a few power components at the entrance of the microprocessor 41 which generate the three PWM regulation signals. All the components, including the emitting LEDs, are of the SMT (Surface Mount Technology) type and are mounted on the same electronic board which is connected to the main board, by means of a connector, with a three-pole cable.

The operation of the integrated mechanical fixing and electrical connection system, according to the present invention, is substantially the following.

In the presence of a 230 Vac power supply, once installed, an emergency lighting fixture 2, 3, 4, 5, 6 performs its own safety functions, such as switching on its LEDs 25 in case of black-out, charging its own battery 71 and monitoring its operating status in the presence of a power supply.

During the configuration step, the installer can act in various ways to program the operating modes of the lighting fixture 2, 3, 4, 5, 6:
  by acting on the configuration selectors 35, which can be dip-switches, jumpers, rotary selectors or other electromechanical devices integrated in the main circuit 43;
  by interacting with the lighting fixture 2, 3, 4, 5, 6 through an external communication module connected to the serial interface 37; for example, if a radio module 81 is connected, the installer can program the operating modes via a user interface resident on a PC or smartphone or tablet, possibly connected remotely via the internet or via the cloud interface.

The installer can also configure the basic operating modes of the emergency lighting fixture 2, 3, 4, 5, 6, such as:
  the light power-on mode, between "always on" or "emergency only";
  the power-on duration in case of blackout, i.e. the desired number of power-on hours in the absence of electricity;
  the self-diagnosis and execution modes of periodic tests.

In addition, the installer is able to configure how to use the lighting fixture 2, 3, 4, 5, 6 in relation to the geometric installation conditions. For example, the following different installation conditions can be catalogued:
  Signage;
  At Corridor Wall;
  Corridor Ceiling;
  Above-Door;
  Large Wall Area;
  Large Ceiling Area.

Each of these conditions is associated with a different spatial distribution of light which is obtained by appropriately adjusting the intensity of each string 40 of LEDs. For example, when lighting a corridor, the light will be emitted mainly by type 3 elliptical lenses.

The following table shows, by way of example, an optimisation scheme created by driving three sets of "Side emitting" (type 3), "Lungaluce" (type 1), "Largaluce" (type 2) lenses:

| Installation condition | Type 1 lens | Type 2 lens | Type 3 lens | Overall light flux (lm) |
| --- | --- | --- | --- | --- |
| Signage | 50% | 0% | 0% | 500 |
| At Corridor Wall | 100% | 0% | 0% | 1000 |
| Corridor Ceiling | 0% | 100% | 0% | 1000 |
| Above-Door | 50% | 0% | 100% | 1500 |
| Large Wall Area | 100% | 0% | 100% | 2000 |
| Large Ceiling Area | 85% | 85% | 85% | 2550 |

In this way, the installer, using a single type of lighting fixture 2, 3, 4, 5, 6, can adjust it through the initial configuration to any installation condition.

The configuration can also be customised on the basis of the lighting simulation carried out when designing an emergency lighting system, by customising the lighting performance. Once the lighting simulation has been carried out, a special calculation program provides the driving percentages of the three channels of the string 40 of LEDs, which are sent via the cloud, by means of the radio communication interface 81. The lighting fixture 2, 3, 4, 5, 6, therefore, once installed, receives, for example via radio by means of the communication module 81 housed in the junction box 10, its optimised lighting configuration relative to its position. In this way, an optimisation of the distribution of the safety light for that specific installation is achieved; furthermore, the battery 71 is used in the best possible way having chosen during the design stage whether to favor the light intensity or the duration and the desired spatial distribution of light.

The invention thus conceived and illustrated here is susceptible of numerous modifications and variations, all falling within the scope of the inventive concept of the attached claims.

Furthermore, all the details can be replaced by other technically equivalent elements.

Finally, the components used, as long as they are compatible with the specific use, as well as the dimensions, may be any according to the needs and the state of the technique.

Where the features and techniques mentioned in any claim are followed by reference marks, such reference marks have been included with the sole aim of increasing the intelligibility of the claims and, consequently, such reference marks have no limiting effect on the interpretation of each element identified by way of example by such reference signs.

The invention claimed is:

1. An integrated mechanical fixing and electrical connection system, comprising:
   a junction box and a lighting fixture, wherein said junction box includes a first electrical connector for electrically connecting said lighting fixture to the mains power supply of a system,
   a coupling mechanism and a second electrical connector for fixing and electrically connecting said lighting fixture to said junction box, and
   a compartment adapted to house accessories of the lighting fixture and an inner space available to an installer for the wiring of said electrical system which passes in correspondence of fittings placed laterally to and/or at the bottom of said junction box,
   wherein said first electrical connector is a multipolar electrical connector,
   wherein said lighting fixture includes a series of lenses and/or LEDs on said light emission surface, which are placed so that a reflecting portion of said light emitting surface includes one or more string of LEDs and that each set of LEDs of a string is coupled with a specific type of optical lens, wherein said optical lenses are designed to create a concentrated beam of light, a widened beam of light and an elliptical beam of light,
   wherein said lighting fixture includes an electronic control circuit comprising a first microprocessor, which is connected to a block containing a power supply unit, a battery charger and presence sensors of the electrical network and which is configured to manage the operation of said lighting fixture and the charge of a main battery of said lighting fixture and of an auxiliary battery placed inside said compartment of said junction box, said auxiliary battery being connected to said second electrical connector for the connection to said lighting fixture and said first microprocessor being connected to a serial interface for communicating with said junction box and being adapted to regulate, by means of a plurality of respective current regulators, the current driving intensity of each string of LEDs.

2. The integrated system of claim 1, wherein said coupling mechanism comprises a series of shaped seats, made on the back of said lighting fixture and on an opposite side relative to a light emitting surface of the lighting fixture, which are adapted to house said junction box, and a series of spring hooks placed on said lighting fixture, and fitting into the walls of said junction box.

3. The integrated system of claim 1, wherein said junction box is equipped with a removable lid to cover said compartment and said inner space.

4. The integrated system of claim 1, further comprising a bubble fixed inside said junction box, said bubble being adapted to place said junction box in a horizontal position.

5. The integrated system of claim 1, wherein said lighting fixture includes, on respective side walls and/or on bottom walls opposite to said light emitting surface of said fixture, pre-engraved shapes for removing respective partitions, so as to allow the passage of pipes of said electrical system.

6. The integrated system of claim 1, wherein further comprising a radio communication module inside said compartment of the junction box, said radio communication module being connected to said second electrical connector for realizing networks of lighting fixtures connected to each other and remotely controllable.

7. The integrated system of claim 6, wherein said radio communication module incorporates a temperature sensor and/or other positioning sensors and/or devices for connecting emergency systems and/or systems for repeating a Wi-Fi signal.

8. The integrated system of claim 1, further comprising an electronic module inside said compartment of the junction box, said electronic module being is connected to said second electrical connector, to monitor the electrical system of which said junction box forms part and to measure the power and energy consumed by the electrical utilities of the electrical system or by the lighting fixtures coupled with said electrical system.

9. The integrated system of claim 1, wherein said first microprocessor is connected, by means of a serial line, to a second microprocessor adapted to drive each string of LEDs through respective current regulators, said electronic control circuit being divided into a main electronic circuit, which comprises said first microprocessor, said block containing said power supply unit, said battery charger and said presence sensors of the electrical network, said main battery of the lighting fixture and said serial interface, and into a secondary electronic circuit, which comprises said second microprocessor, said current regulators and said one or more string of LEDs.

* * * * *